United States Patent [19]

Cecchi et al.

[11] Patent Number: 4,533,092
[45] Date of Patent: Aug. 6, 1985

[54] VIDEO CASSETTE RAPID REWINDING/FAST FORWARDING DEVICE

[75] Inventors: Marino Cecchi, Lincolnshire; Gregory J. Borucki, Hinsdale; Lawrence R. Happ, Mundelein, all of Ill.

[73] Assignee: Suncom, Incorporated, Wheeling, Ill.

[21] Appl. No.: 614,954

[22] Filed: May 29, 1984

[51] Int. Cl.³ .................. B65H 59/38; G03B 1/04; G11B 15/32
[52] U.S. Cl. ................... 242/186; 242/200; 242/201; 360/73
[58] Field of Search ............ 242/186, 189, 190, 198, 242/200; 360/73, 74.2, 93, 96.3, 96.5, 132; 220/326, 334

[56] References Cited

U.S. PATENT DOCUMENTS

| | | | |
|---|---|---|---|
| 3,514,050 | 5/1970 | Yamamoto et al. | 242/198 |
| 3,809,219 | 5/1974 | Esashi | 220/326 |
| 4,159,492 | 6/1979 | Ban et al. | 360/74.1 |
| 4,159,810 | 7/1979 | Hodkinson et al. | 242/198 |
| 4,189,114 | 2/1980 | Yukawa | 242/186 |

Primary Examiner—Leonard D. Christian
Attorney, Agent, or Firm—Gary, Juettner & Pyle

[57] ABSTRACT

A video tape cassette rapid rewinding/fast forwarding is characterized by a housing on a surface of which are drive and idler sprockets. To rapidly advance or rewind a cassette, the cassette is placed on the surface to extend the sprockets into its tape reels, with winding or rewinding being determined by the orientation of the cassette and therefore the particular one of its reels engaged with the drive sprocket. A selected one of a pair of microswitches is actuated by the cassette in accordance with its orientation, and controls energization of an electric motor to rotate the drive sprocket in the appropriate direction. Releasable clips hold the cassette on the sprockets and the drive sprocket has tapered teeth, so that upon completion of forwarding or rewinding and termination of rotation of the reels, the cassette is forced off of the drive sprocket and away from the clips to deactuate the microswitch and deenergize the motor. The device may be operated by either self-contained batteries or external power.

10 Claims, 7 Drawing Figures

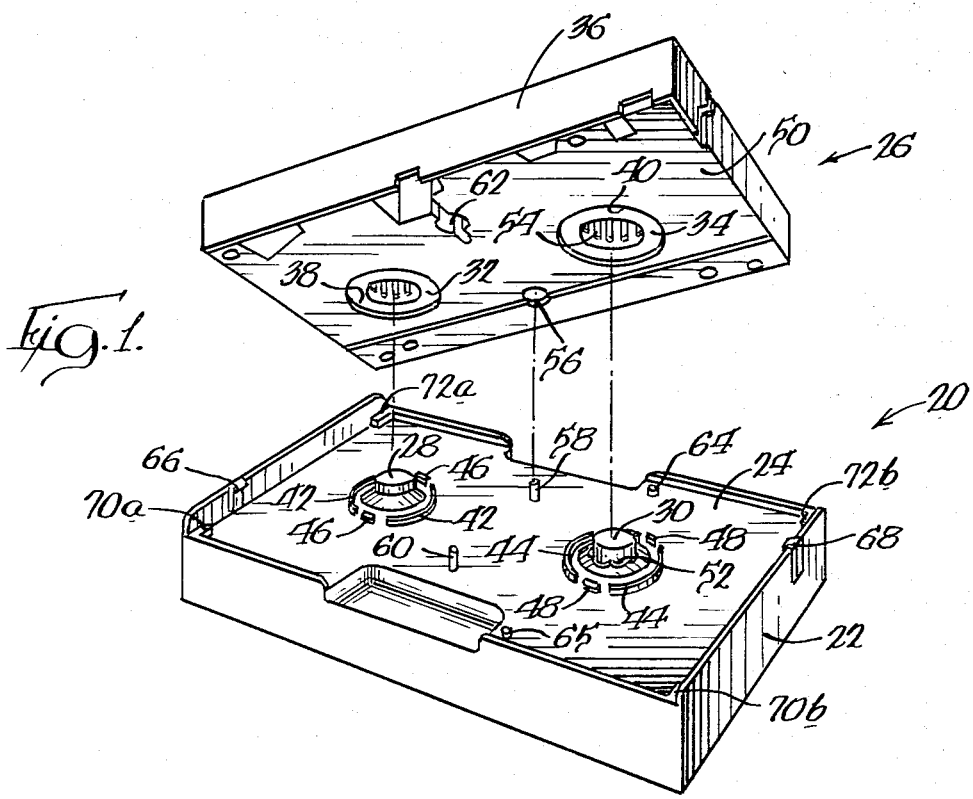
Fig. 1.
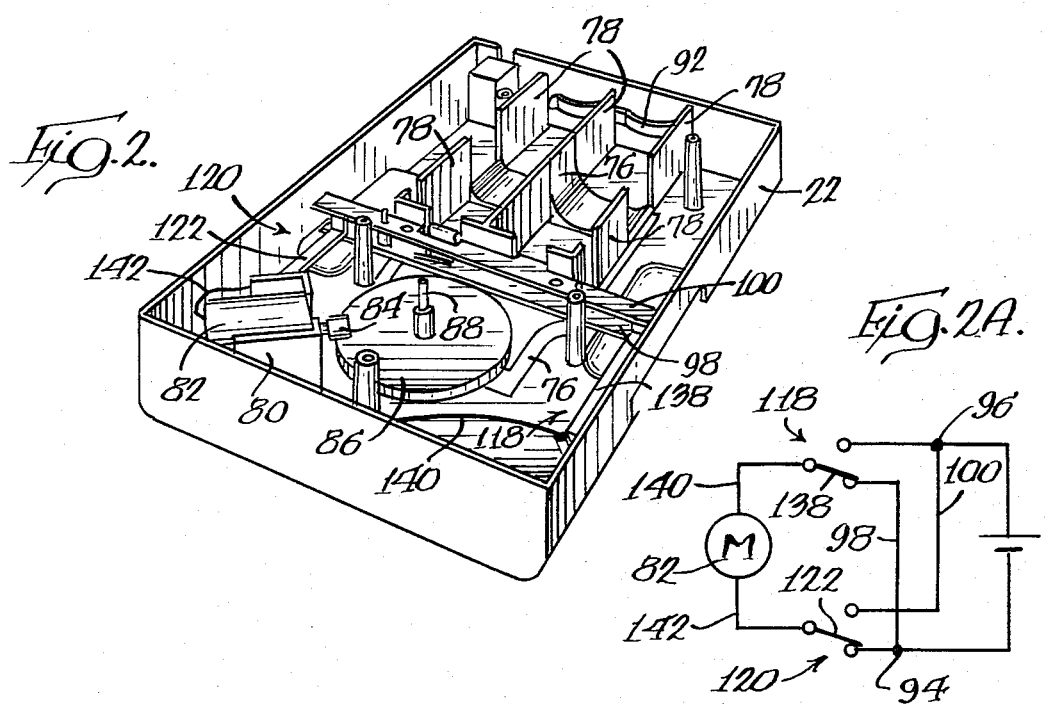
Fig. 2.
Fig. 2A.

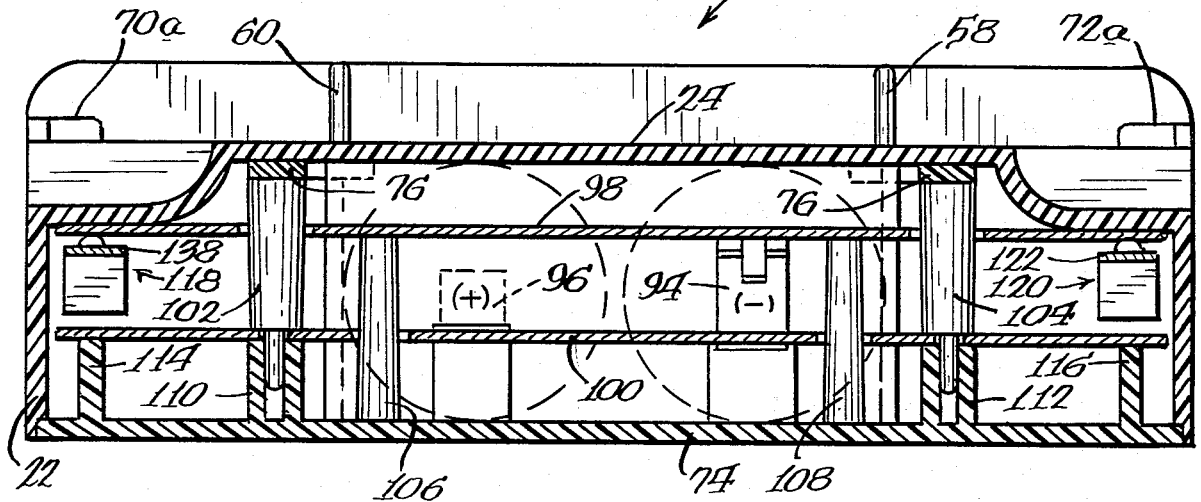

VIDEO CASSETTE RAPID REWINDING/FAST FORWARDING DEVICE

BACKGROUND OF THE INVENTION

The present invention relates to tape cassette winders/rewinders, and in particular to an economical and convenient to use device for rapidly rewinding or fast forwarding video tape cassettes.

As is known, when only a portion of a video cassette is used during recording or playback, to properly support and orient the tape on its reels, after use it should be advanced to its end and then fully rewound. Video cassette recorders conventionally include fast forward and rapid rewind functions, and may be employed for the purpose. However, such use subjects the recorder to increased wear, and it is often necessary for a user to attend the recorder during tape advancing and rewinding. In addition, it is not uncommon for a user, after recording or playing back a tape, to immediately insert a subsequent tape into the recorder, with the result that several tapes may be awaiting winding and/or rewinding.

To avoid any need to attend a video recorder during advancing and rewinding of tapes, as well as to minimize wear of the recorder, it would be advantageous to provide a separate, reliable and economical video tape cassette winder and rewinder for the purpose.

OBJECTS OF THE INVENTION

An object of the present invention is to provide an economical device for rapidly rewinding and fast forwarding video tape cassettes.

A further object is to provide such a device which automatically rewinds or forwards a video tape cassette in accordance with the orientation of the cassette on the device.

Another object is to provide such a device, which upon completion of cassette winding or rewinding automatically shuts itself off.

A still further object is to provide such a device which may be powered by internal batteries and is substantially configured like a video tape cassette for vertical storage in a rack with cassettes.

SUMMARY OF THE INVENTION

In accordance with the present invention, a device for rapidly rewinding and fast forwarding a conventional video tape cassette having a door along its front edge and first and second tape reels, comprises a housing having a surface for receiving the cassette thereon, and rotatable drive and idler sprockets on said surface, each for operatively engaging a respective one of the reels in accordance with the orientation of the cassette on said surface. Also included are motor means in said housing for rotating said drive sprocket in first and second directions, and means responsive to the orientation of the cassette on said surface for controlling operation of said motor means to rotate said drive sprocket in said first direction when said drive sprocket engages the first reel and in said second direction when said drive sprocket engages the second reel to rapidly rewind or fast forward the cassette.

The foregoing and other objects, advantages and features of the invention will become apparent upon a consideration of the following detailed description, when taken in conjunction with the accompanying drawings.

BRIEF DESCRIPTION OF THE DRAWINGS

FIG. 1 is a perspective view of a video tape cassette rapid rewinding/fast forwarding device according to the teachings of the present invention, illustrating a cassette oriented to be placed on the device;

FIG. 2 is a bottom perspective view of the interior of an upper housing of the device;

FIG. 2A is a schematic representation of a circuit for operating a tape drive motor of the device;

FIG. 4 is a cross sectional side elevation upright view taken substantially along the lines 4—4 of FIG. 3, and also shows a bottom panel for closing the upper housing;

FIG. 6 is a cross sectional side elevation upright view taken substantially along the lines 6—6 of FIG. 3, and also illustrates a video tape cassette placed on an upper surface of the housing.

DETAILED DESCRIPTION

Figure 3:
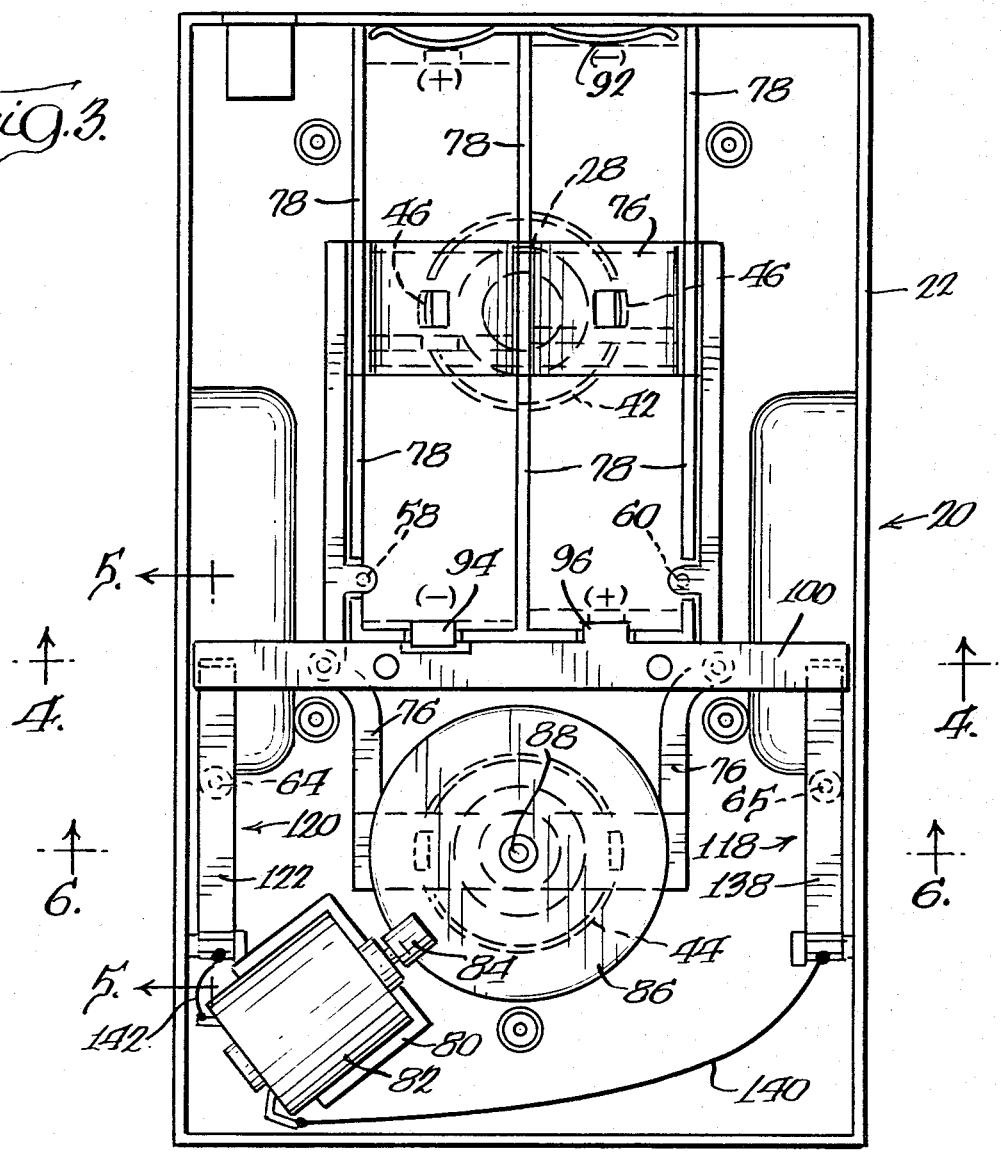
FIG. 3 is a bottom plan view of the upper housing.

The video tape cassette rapid rewinding/fast forwarding device of the invention is indicated generally at 20 in FIG. 1, and includes a housing 22 having an upper surface 24 on which a VHS video tape cassette, indicated generally at 26, is placed for having its tape rapidly rewound or fast forwarded. An idler sprocket 28 and a drive sprocket 30 are on the surface, and the sprockets are adapted to be received within tape reels 32 and 34 of the cassette. The drive sprocket is rotated by an electric motor, and may be received in either tape reel depending upon the orientation of the cassette on the device, thereby to either advance or rewind the tape. For the orientation shown with a door 36 of the cassette facing forwardly, the drive sprocket will engage the tape reel 34 to rewind the cassette.

Circular openings 38 and 40 in an outer casing of the cassette are generally coaxial with the tape reels 32 and 34, and as is conventional are provided with a taper around their circumference. When the cassette is placed on the surface 24 of the device, semicircular ridges 42 around the idler sprocket 28 and semicircular ridges 44 around the drive sprocket 30 enter the openings to prevent sliding of the cassette on the surface. Also provided to opposite sides of the idler and drive sprockets are respective pairs of resilient retention clips 46 and 48. When the cassette is placed on the device and pressed down firmly, the idler and drive sprockets elevate the reels slightly and the retention clips are cammed inwardly by the tapered circumferences of the openings into releasable latching retention with a bottom wall 50 of the cassette casing. This releasably mounts the cassette on the device with tapered teeth 52 of the drive sprocket engaged with teeth 54 in the tape reel 34, so that rotation of the sprocket rotates the reel.

As is known, such video cassettes include an internal ratchet to lock the reels against rotation when the cassette is not in use. The ratchet is accessible through an opening 56 in the bottom wall 50, and is released by means of extending a post into the opening. Therefore, to free the reels 32 and 34 for rotation when the cassette is placed on the device, a pair of upstanding posts 58 and 60 are on the surface 24. For the orientation of the cassette shown, the post 58 enters the opening 56 and releases the ratchet while the post 60 enters an opening 62. Should the cassette be rotated through 180° for placement of the tape reel 32 on the drive sprocket 30, thereby to orient the same for being fast forwarded, then the post 60 will enter the opening 56 and release the ratchet while the post 58 enters the opening 62.

If the cassette 26 is to be rapidly rewound, upon being placed on the device 20 in the orientation shown, the drive sprocket 30 must rotate counterclockwise when viewed from above. On the other hand, if the cassette is rotated through 180° and placed on the device for being fast forwarded, to rotate the tape reel 32 in the proper direction, the drive sprocket must then rotate clockwise.

Accordingly, means are also provided, in the form of a pair of microswitches (to be described) having actuator posts 64 and 65 extending upwardly through the surface 24, for controlling the direction of energization of the motor for rotating the drive sprocket 30. As is conventional, the axes of rotation of the tape reels 32 and 34 are closer to the rear edge of the cassette than to the door 36, and that particular structural feature is utilized to advantage in the device, in that the microswitch posts are generally equidistant to opposite sides of the idler and drive sprockets, and are positioned so that when the cassette is placed on the device in the orientation shown, only the microswitch post 65 is engaged and depressed by the cassette to energize the motor to rotate the drive sprocket in the counterclockwise direction. However, if the cassette is rotated through 180° and placed on the device, then only the microswitch post 64 will be depressed to energize the motor to rotate the drive sprocket in the clockwise direction. Thus, the microswitches both energize and control the direction of energization of the motor to rotate the drive sprocket in the proper direction in accordance with the cassette being oriented for being fast forwarded or rapidly rewound.

If the cassette 26 were fast forwarded or rapidly rewound with the door 36 fully closed, movement of the tape closely past the inside surface of the door would develop a static electrical charge on the door, causing attraction of the tape to the door and defeating operation of the device and/or damaging the tape. Therefore, also included are a pair of cassette door latch release levers 66 and 68 and two pairs of associated door opening or elevating tabs 70a–b and 72a–b. The cassette has a door release latch (not shown), which for the VHS cassette in FIG. 2 would be along the left side of the cassette at the rearward end of the door. The arrangement is such that when the cassette is placed on the device for rapid rewinding, the lever 66 engages and releases the door latch and the tabs 70a and 70b engage and elevate or open the door somewhat, while when the cassette is oriented for fast forwarding, the lever 68 then releases the door latch and the tabs 72a and 72b open the door slightly. Although the door is not fully opened, it is opened sufficiently to allow a flow of air between the tape and door to carry away static charges, while at the same time providing an increased spacing therebetween to prevent attraction of the tape to the door by any remaining accumulated charge.

The device 20 further incorporates an automatic shut-off feature, which includes the tapered drive sprocket teeth 52, for terminating operation of the device upon completion of tape forwarding or rewinding. When rapid rewinding or fast forwarding is complete and the tape reels 32 and 34 stop turning, because of the tapered teeth, continued momentary rotation of the drive sprocket forces the cassette away from the sprocket and the clips 46 and 48, thereby causing release of whichever microswitch post 64 or 65 is then being depressed to deenergize the motor. Consequently, the device need not be attended during its operation.

Figure 5:
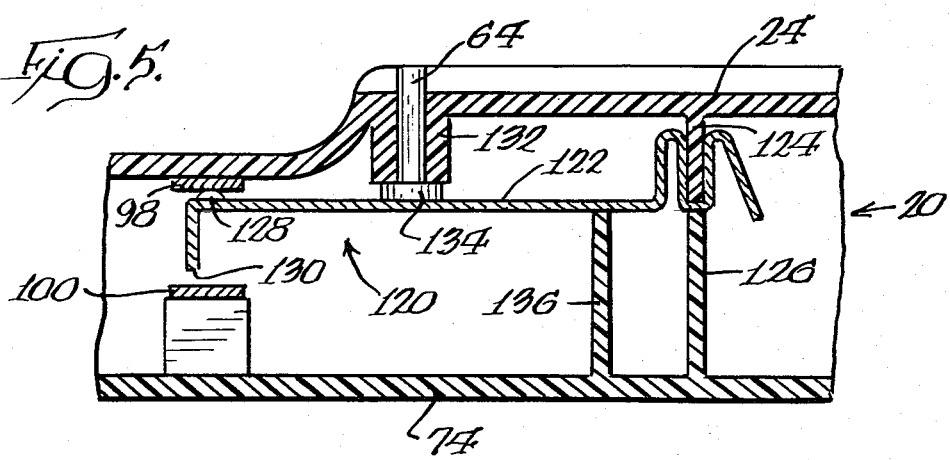
FIG. 5 is a cross sectional side elevation upright view taken substantially along the lines 5—5 of FIG. 3.

Structural details of the interior of the device 20 are illustrated in FIGS. 2–6, FIGS. 2 and 3 of which show the interior of the housing 22 as inverted and FIGS. 4–6 cross sectional views of the housing in upright position, together with a bottom panel 74 connected with and closing the housing. Carried by the housing is an integral, preferably plastic insert member 76, on which are formed the posts 58 and 60 and the retaining clips 46 and 48, which extend upwardly through passages in the surface 24. A downwardly extending panel portion of the member and six housing walls 78 define two compartments, each for containing two batteries for powering the device.

Toward a corner of the housing and supported in a bracket 80 is a d.c. electric motor 82, which carries on its output shaft a friction wheel 84, for example of 75 durometer EPDM rubber. The friction wheel is urged against the surface of a flywheel 86 having a shaft 88, an upper end of the shaft is press fit into the drive sprocket 30, the lower end is rotatably received in a passage in an extension 90 of the bottom panel 74, and a suitable lubricant is provided in the passage. In consequence, energization of the motor rotates the flywheel and therefore the drive sprocket.

The idler sprocket 28 is mounted for free rotation in either direction in accordance with whether the cassette is being rapidly rewound or fast forwarded. Advantageously, an idler sprocket shaft (not shown) is press fit into a passage in the insert member 76 and extends upwardly through an opening in the surface 24 of the housing 22. The shaft is received in a center passage (also not shown) of the idler sprocket for rotation of the sprocket thereabout, and to maintain the sprocket free wheeling a medial portion of the shaft may be enlarged to support the lower surface of the sprocket slightly above the housing surface, with an upper end of the shaft then being peened over to capture the sprocket on the shaft.

The remaining major components of the device generally comprise those forming an electrical circuit for operating the motor 82 in a direction in accordance with whichever microswitch post 64 or 65 is depressed upon placement of the cassette 26 on the device 20. With two batteries in each compartment defined by the panel of the insert member 76 and the housing walls 78, a conductive metal jumper strip 92 spanning one end of each compartment connects the batteries in series between a negative terminal 94 and a positive terminal 96. The negative terminal connects, either directly or through an a.c. adapter (not shown), with an elongate metal strip 98 extending transversely across the housing, and the positive terminal connects with an elongate metal strip 100 which also extends transversely across the housing coextensively with the strip 98. To support the strips in position, a pair of posts 102 and 104 formed integrally with the insert member 76 extend downwardly through aligned passages in the strips, and a pair of posts 106 and 108 formed integrally with the bottom panel 74 extend upwardly through passages in the strip 100 into engagement with the strip 98. In addition, a pair of hollow columns 110 and 112, also integral with the bottom panel 74, receive lower ends of the posts 102 and 104 and support the strip 100 thereat, and a pair of walls 114 and 116 extending upwardly from the panel support opposite ends of the strip 100.

A pair of microswitches, indicated generally at 118 and 120, are at opposite ends of the strips 98 and 100. Each microswitch 118 and 120 is adapted to be actuated in response to downward movement of its associated post 65 and 64, and with reference to FIG. 5 it is seen that the microswitch 120 includes a flexible conductive metal strip 122 mounted at one end between a downwardly entending upper housing wall 124 and an upwardly extending bottom panel wall 126. An opposite end of the strip extends to between the ends of the negative and positive elongate strips 98 and 100, carries on its upper surface a contact 128 and is bent downwardly to define a contact 130. The microswitch post 64 is slidably received in a passage through an extension 132 of the upper housing, and has at its lower end an enlarged portion 134. The strip 122 is normally urged upwardly by a post 136 to maintain the contact 128 against the metal strip 98 and the post 64 in an elevated position, with the contact 130 then being out of engagement with the strip 100. However, upon placement of the cassette on the device 20 in an orientation that causes the post 64 to be depressed, the strip 122 is flexed downwardly out of electrical contact with the strip 98 and into electrical contact with the strip 100. The structure of the microswitch 118 is similar to that of the microswitch 120, and will therefore not be described in detail, except to note that a flexible conductive metal strip 138 of the microswitch 118 is equivalent to the strip 122 of the microswitch 120.

The conductive strip 138 of the microswitch 118 is connected through a conductor 140 to one electrical input to the motor 82, and the conductive strip 122 of the microswitch 120 is connected to the other electrical input to the motor by a conductor 142. With particular reference to FIG. 2A, wherein the schematic portions of the circuit have been given the numbers of the mechanical elements they represent, it is seen that when there is no cassette on the device 20, both inputs to the motor are connected to negative battery voltage, and the motor is not energized. However, upon placement of the cassette on the device in the orientation shown in FIG. 1, the post 65 of the microswitch 118 will be depressed, causing the strip 138 to contact the strip 100 and apply a positive voltage to one input to the motor while a negative voltage is being applied to the other input, thereby energizing the motor for operation in a direction to rapidly rewind the cassette. On the other hand, should the orientation of the cassette be reversed so that the post 64 of the microswitch 120 is depressed, then the voltage polarities at the motor inputs will be reversed and the motor will be operated in a direction to fast forward the cassette.

FIG. 6 illustrates the cassette 26 placed on the device 20 in orientation for rapid rewinding. Under this circumstance, the drive sprocket 30 extends into the tape reel 34, and because of the axial placement of the tape reels 32 and 34, only the microswitch post 65 is depressed by the cassette, so that the motor 82 is energized in a direction to rewind the cassette. At the same time, the door release lever 66 has released the latch (not shown) for the cassette door 36 and the door opening tabs 70a and 70b elevate and hold the door slightly open, so that a sufficient space exists between the moving tape and the inside front surface of the door to prevent electrostatic attraction of the tape to the door. If the cassette were rotated through 180° for being fast forwarded, then the drive sprocket 30 would be received within the tape reel 32, only the microswitch post 64 would be depressed to energize the motor 82 for operation in the appropriate direction, the door release lever 68 would unlatch the cassette door, and the door opening tabs 72a and 72b would elevate and hold the door slightly open. It is to be noted, however, that irrespective of whether the cassette is oriented for rapid rewinding or fast forwarding, upon the tape reels 32 and 34 ceasing to rotate upon completion of the operation, momentary continued rotation of the drive sprocket will force the tape reel with which it is engaged, by virtue of the tapered drive sprocket teeth 52, away from the drive sprocket to release the cassette from the clips 46 and 48 and elevate the cassette off of the microswitch post then being depressed to automatically deenergize the motor. Simultaneously, upward movement of the cassette will raise the forward edge of the cassette door off of the door opening tabs and release the door latch, so that the door will again be locked in place.

Operation of the video cassette rapid rewinding/fast forwarding device of the invention is therefore completely automatic, and after placement of a cassette on the device, there is no need for a user to monitor its operation. Although not shown, it is understand that if desired the device could readily be equipped for operation without batteries by means of an a.c. adapter, or if desired rechargeable batteries could be used in conjunction with and be recharged by such an adapter. Also, while the device has been described as being for use with VHS video cassettes, the teachings of the invention could just as readily be employed with cassettes of the beta type, it only being necessary in such case to relocate the posts 58 and 60, the door release latches 66 and 68 and the microswitch posts 64 and 65 to accommodate the particular structural features of a conventional beta cassette.

While one embodiment of the invention has been described in detail, various modifications and other embodiments thereof may be devised by one skilled in the art without departing from the spirit and scope of the invention, as defined in the appended claims.

What is claimed is:

1. A device for rapidly rewinding and fast forwarding a conventional video tape cassette having a door along its front edge and first and second tape reels, comprising a housing having a surface for receiving the cassette thereon; rotatable drive and idler sprockets on said surface, each for operatively engaging a respective one of the reels in accordance with the orientation of the cassette on said surface; motor means in said housing for rotating said drive sprocket in first and second directions; and means responsive to the orientation of the cassette on said surface for controlling operation of said motor means to rotate said drive sprocket in said first direction when said drive sprocket engages the first reel and in said second direction when said drive sprocket engages the second reel to rapidly rewind or fast forward the cassette.

2. A device as in claim 1, including means for releasably retaining the cassette in position on said surface during rapid rewinding and fast forwarding thereof.

3. A device as in claim 2, including means responsive to completion of rapid rewinding or fast forwarding of the cassette for freeing the cassette from said means for releasably retaining.

4. A device as in claim 3, wherein said means for freeing includes tapered teeth on said drive sprocket for meshing with teeth in the tape reels, said tapered teeth, upon termination of rotation of the reels upon completion of rapid rewinding or fast forwarding of the cassette and continued rotation of said drive sprocket, pushing the teeth in the tape reel with which they are meshed, and therefore the tape reel and cassette, away from said means for releasably retaining.

5. A device as in claim 1, wherein the tape reels have axes of rotation which are closer to a rear edge of the cassette than to the door, said motor means includes electric motor means, and said means for controlling operation of said motor means comprises first and second switch means, each having an actuator on said housing surface to opposite sides of and generally equidistant from an imaginary line between said drive and idler sprocket axes, said first and second switch means being coupled with said motor means for respectively controlling energization thereof to rotate said drive sprocket in said first or second direction, said actuators being positioned such that when the cassette is oriented so that said drive sprocket engages the first reel the cassette engages said first switch means actuator, but not said second switch means actuator, to energize said motor means to rotate said drive sprocket in said first direction, and such that when the cassette is oriented so that said drive sprocket engages the second reel the cassette engages said second switch means actuator, but not said first switch means actuator, to energize said motors means to rotate said drive sprocket in said second direction, whereby the cassette is rapidly rewound or fast forwarded in accordance with its orientation on said surface.

6. A device as in claim 1, wherein said motor means includes electric motor means, and said means for controlling operation of said motor means includes first and second switch means, each having an actuator on said housing surface for being operated by the cassette, said first and second switch means being coupled with said motor means for respectively controlling energization thereof to rotate said drive sprocket in said first or second direction, said actuators being positioned such that when the cassette is oriented so that said drive sprocket engages the first reel the cassette operates only said first switch means actuator, and such that when the cassette is oriented so that said drive sprocket engages the second reel the cassette operates only said second switch means actuator, whereby the cassette is rapidly rewound or fast forwarded in accordance with its orientation on said surface.

7. A device as in claim 6, including means for releasably retaining the cassette on said surface to operate a selected one of said switch means actuators during rapid rewinding and fast forwarding of the cassette, and means for freeing the cassette from said means for releasably retaining and for moving the cassette out of operative relationship with said selected one actuator upon completion of rapid winding or fast forwarding to automatically deenergize said motor means.

8. A device as in claim 1, wherein the cassette has a latch normally locking the door closed, and including means on said housing for unlatching and at least partially opening the door during rapid rewinding and fast forwarding of the cassette.

9. A device as in claim 1, wherein the cassette has an internal ratchet which prevents rotation of the tape reels, and including means on said housing surface for disengaging the ratchet to render the tape reels free for rotation during rapid rewinding and fast forwarding of the cassette.

10. A device as in claim 2, wherein the cassette has an outer casing and first and second openings in the casing generally concentric with and exposing the first and second reels, and said means for releasably retaining comprises two pairs of resilient clips on said housing surface, one each to opposite sides of each of said drive and idler sprockets, said drive and idler sprockets moving the tape reels away from the openings and said resilient clips entering the casing openings and releasably gripping the casing when the cassette is received on said surface.

* * * * *